United States Patent
Weeber

(10) Patent No.: US 8,484,518 B2
(45) Date of Patent: Jul. 9, 2013

(54) SYSTEM AND METHOD FOR CONSECUTIVE IDENTICAL DIGIT REDUCTION

(75) Inventor: William Weeber, Raleigh, NC (US)

(73) Assignee: Alcatel Lucent, Paris (FR)

( * ) Notice: Subject to any disclaimer, the term of this patent is extended or adjusted under 35 U.S.C. 154(b) by 803 days.

(21) Appl. No.: 12/635,820

(22) Filed: Dec. 11, 2009

(65) Prior Publication Data
US 2010/0272430 A1 Oct. 28, 2010

Related U.S. Application Data

(60) Provisional application No. 61/214,780, filed on Apr. 28, 2009.

(51) Int. Cl.
*G06F 11/00* (2006.01)

(52) U.S. Cl.
USPC ............... 714/701; 714/811; 714/812

(58) Field of Classification Search
USPC ............... 714/701, 704, 809, 811, 812
See application file for complete search history.

(56) References Cited

U.S. PATENT DOCUMENTS

| | | | | |
|---|---|---|---|---|
| 5,400,361 A | * | 3/1995 | Brauns et al. | 375/224 |
| 5,589,683 A | * | 12/1996 | Nakai | 250/214 R |
| 6,700,903 B1 | * | 3/2004 | Boyd et al. | 370/503 |
| 8,175,143 B1 | * | 5/2012 | Wong et al. | 375/232 |
| 2003/0020514 A1 | * | 1/2003 | Takeo et al. | 327/3 |
| 2005/0025195 A1 | * | 2/2005 | Barrett et al. | 370/532 |
| 2005/0218999 A1 | * | 10/2005 | Jasa et al. | 331/16 |
| 2006/0200708 A1 | * | 9/2006 | Gentieu et al. | 714/704 |
| 2006/0253748 A1 | * | 11/2006 | Brink et al. | 714/715 |
| 2007/0299894 A1 | | 12/2007 | Muraoka | |
| 2008/0069276 A1 | * | 3/2008 | Wong et al. | 375/350 |
| 2008/0181212 A1 | * | 7/2008 | Curcio et al. | 370/389 |
| 2009/0072865 A1 | * | 3/2009 | Bae et al. | 327/58 |
| 2009/0122935 A1 | * | 5/2009 | Pang et al. | 375/360 |

FOREIGN PATENT DOCUMENTS

| | | |
|---|---|---|
| EP | 1115223 A2 | 7/2001 |
| EP | 1684433 A1 | 7/2006 |
| WO | WO2008101445 A1 | 8/2008 |

OTHER PUBLICATIONS

"Gigabit-capable Passive Optical Networks (G-PON): Transmission convergence layer specification; G.984.3 (Mar. 2008)" ITU-T Standard, International Telecommunication Union, Geneva; CH, No. G984.3 (Mar. 2008), Mar. 29, 2008, XP017433831 p. iii-v, paragraphs [8.1.3.4], [8.1.3.6.2], [8.2.2.3], [9.2.4.4], [11.1.1], [0013]-[13.4], [OV.2].

* cited by examiner

*Primary Examiner* — Joshua Lohn
(74) *Attorney, Agent, or Firm* — RGIP LLC

(57) ABSTRACT

In a data transmission network, such as a passive optical network, the consecutive identical digit (CID) handling requirements may be reduced by providing a CID monitoring module at the transmitter end that monitors the number of CIDs in a transmission stream. Where the CID number exceeds a threshold, an error generation module induces an error in the transmission stream to reduce the CID below the threshold. The modified transmission stream may then be transmitted to a receiver, allowing clock recovery be performed with improved stability at the receiver. Once clock recovery is achieved, the receiver can then process the transmission stream to correct the errors induced at the transmitter end.

20 Claims, 5 Drawing Sheets

SYSTEM AND METHOD FOR CONSECUTIVE IDENTICAL DIGIT REDUCTION

CROSS REFERENCE TO RELATED APPLICATIONS

This application claims priority to U.S. provisional patent application Ser. No. 61/214,780, filed Apr. 28, 2009, the entire contents of which are incorporated by reference herein.

FIELD OF THE INVENTION

This disclosure relates to systems and methods for reducing consecutive identical digit (CID) requirements in data transmission systems, including, but not limited to, optical networks, electrical interfaces and the like.

BACKGROUND OF THE INVENTION

An optical network such as a passive optical network (PON) is a flexible access network that is capable of providing a range of broadband and narrow-band services for business and residential customers. The underlying equipment is considered to be relatively inexpensive for network operators because they do not require any active equipment or power supplies between the operator's central office (CO) and customer's premises (CP). As shown in the PON 10 of FIG. 1, downstream PON traffic is destined from the Optical Line Termination (OLT) 12 residing in the CO towards a number of Optical Network Terminals (ONTs) 16 (or Optical Network Units (ONUs), not shown), residing in the CPs via an optical splitter 14.

Current Gigabit-PON systems (termed GPONs) utilize scrambling techniques to reduce the probability of excessive number of consecutive ones or zeros in the digital transmission. This is necessary to keep the clock recovery mechanism of the receiver locked to the digital signal. The standard requires the receiver to tolerate up to 72 consecutive identical digits (CID). The upstream transmission of the GPON system operates in a burst mode, which requires fast locking at the start of the transmission and the ability to tolerate 96 CID for the remainder of the burst. The start of the burst contains a preamble with CID=1 to accommodate this. Burst mode receivers are more complicated, more costly and less available than continuous mode receivers.

One option is to utilize 8B10B or 9B10B line coding techniques. These techniques require additional bits (bandwidth) in the transmission. In the case of 9B10B coding there is a 10 percent penalty in bandwidth of the transmission medium. One of the proposals for the next generation 10 Gigabit Passive Optical Network (X-GPON1) uses 9B10B coding. The signal that is to be 9B10B encoded has forward error correction (FEC) encoding. The combined overhead of the 9B10B coding and FEC encoding is 25%. The proposal also requires a new transmission convergence (TC) layer standard.

What is desirable is a system and method for improved CID handling.

SUMMARY OF THE INVENTION

In one aspect of the disclosure, there is provided a method for transmitting on a data transmission network comprising analyzing a transmission stream at a transmission end to determine if the transmission stream contains a number of consecutive identical digits exceeding a threshold. For a transmission stream that contains a number of consecutive identical digits exceeding the threshold, an error is generated in the transmission stream that reduces the number of consecutive identical digits below the threshold. The transmission stream containing the generated error is then transmitted.

In one aspect of the disclosure, there is provided a transmitter component of data transmission network configured to transmit a transmission stream to a receiver component of the data transmission network. The transmitter component comprises a consecutive identical digit monitor configured to monitor a transmission stream to determine if the transmission stream contains a number of consecutive identical digits above a threshold, an error generator configured to modify a transmission stream having a number of consecutive identical digits above a threshold to reduce the number of consecutive identical digits below the threshold, and a transmitter configured to transmit the modified transmission stream to a receiver.

In one aspect of the disclosure, there is provided a receiver component of a data transmission network configured to receive a transmission stream from a transmission component of the data transmission network that contains an induced error, and process the received transmission stream to correct the induced error.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
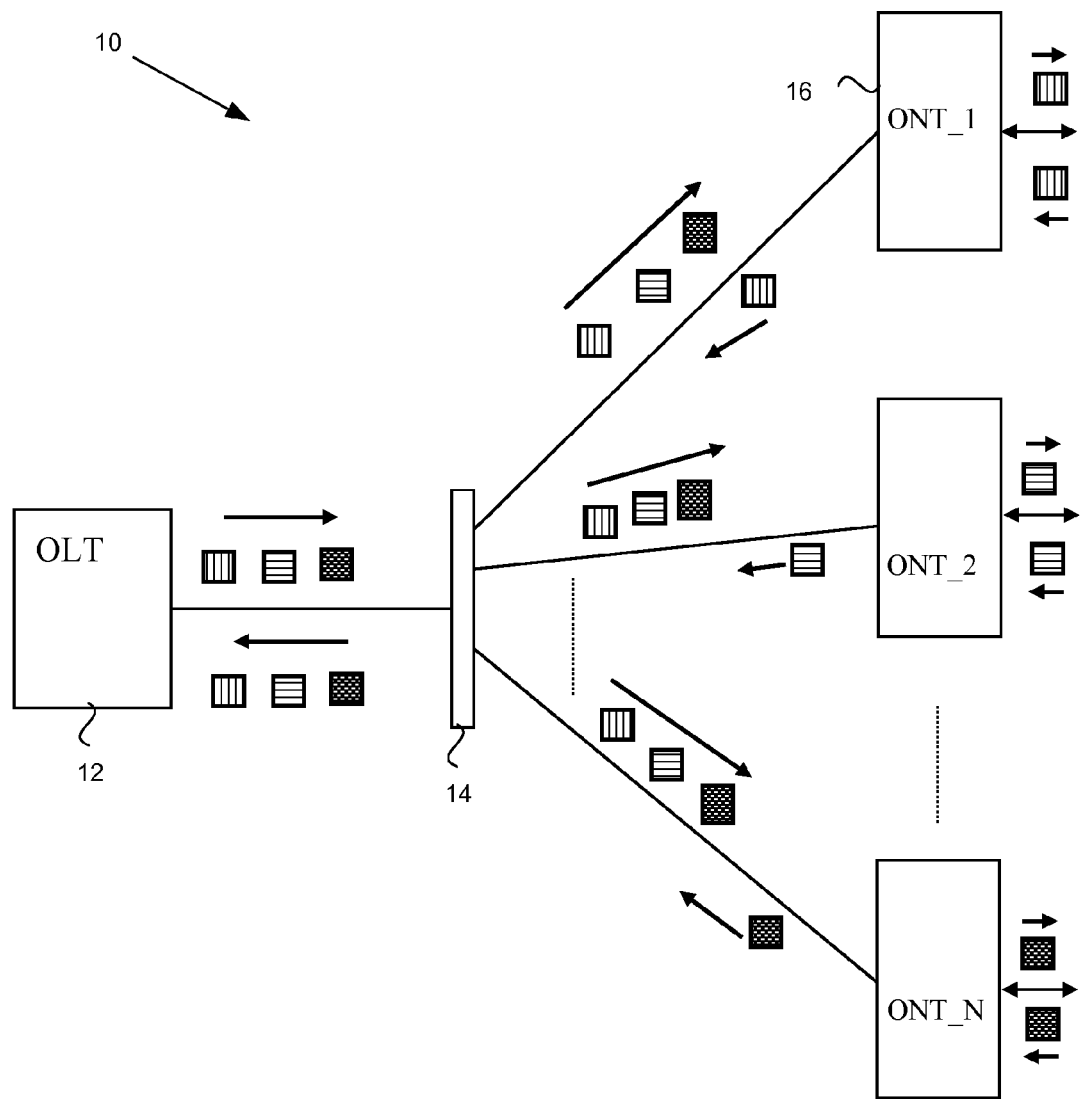
FIG. 1 illustrates a configuration of a passive optical network.
Figure 2:
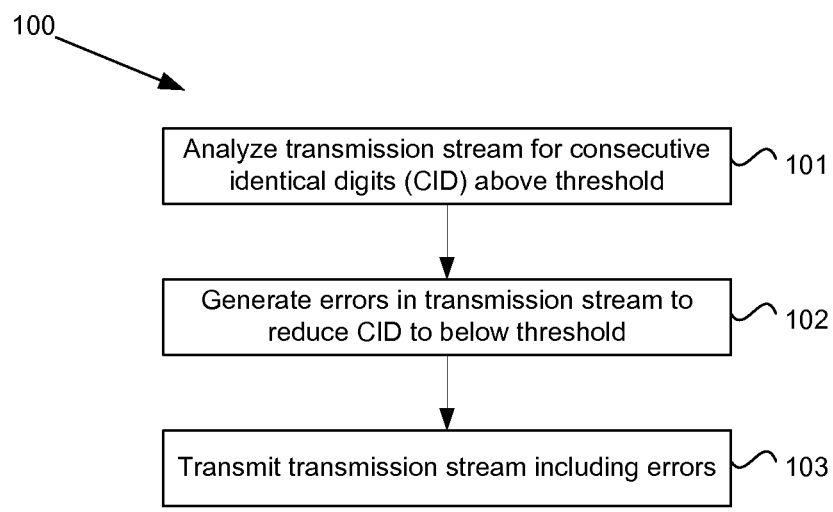
FIG. 2 illustrates a process for transmitting on the passive optical network of FIG. 1.

A method for transmitting on a data transmission network, such as the PON 10 of FIG. 1, is illustrated in the flowchart 100 of FIG. 2. At step 101, a transmission stream for transmission from a transmission end of the network, i.e. the OLT 12 or an ONT 16, is analyzed to determine if the transmission stream contains a number of consecutive identical digits exceeding a threshold. For a transmission stream that contains a number of consecutive identical digits exceeding the threshold, an error is generated in the transmission stream that reduces the number of consecutive identical digits below the threshold (step 102). The transmission stream containing the generated error is then transmitted to a receiver component of the PON (step 103).

Figure 3:
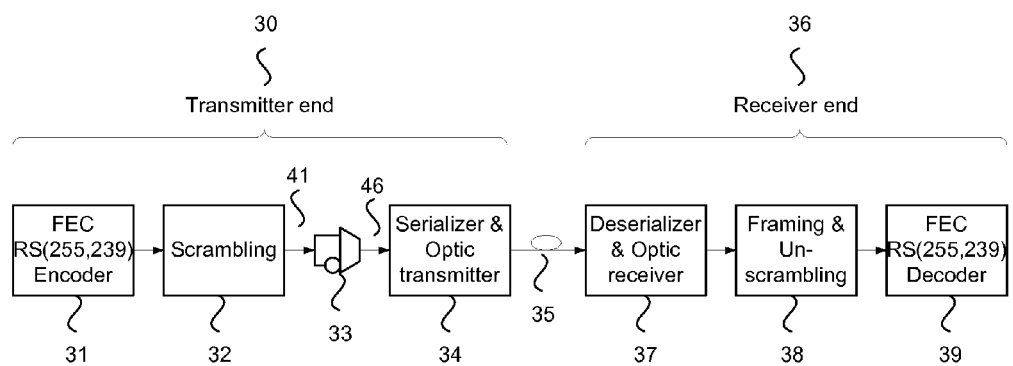
FIG. 3 illustrates transmitter components and receiver components in one embodiment for the process of FIG. 2.

In FIG. 3, there is shown an example of transmitter and receiver components of a GPON that can be modified for providing improved CID performance. The above described process may be embodied for either downstream transmissions, in which case the transmitter will reside in the OLT 12 and the receiver will reside in an ONT 16, or may be embodied for upstream communications, in which case the transmitter resides in the ONT 16 and the receiver resides in the OLT 12. In either embodiment, an FEC encoder 31 at a transmitter end 30 encodes a transmission stream, for example using an (255,239) Reed Solomon (RS) code. The transmission stream is then be scrambled by a scrambler 32. A serializer and optic transmitter 34 then transmits the transmission stream across the network 35, e.g. from the OLT to the ONT or vice versa. During transmission, line errors may occur in the transmission stream. At the receiver end 36, an optic receiver and deserializer 36 receives the transmission stream and passes the stream to a framing and un-scrambling unit 38 for unscrambling. An FEC decoder 39 applies a decoding scheme to correct any line errors that have occurred.

Figure 4:
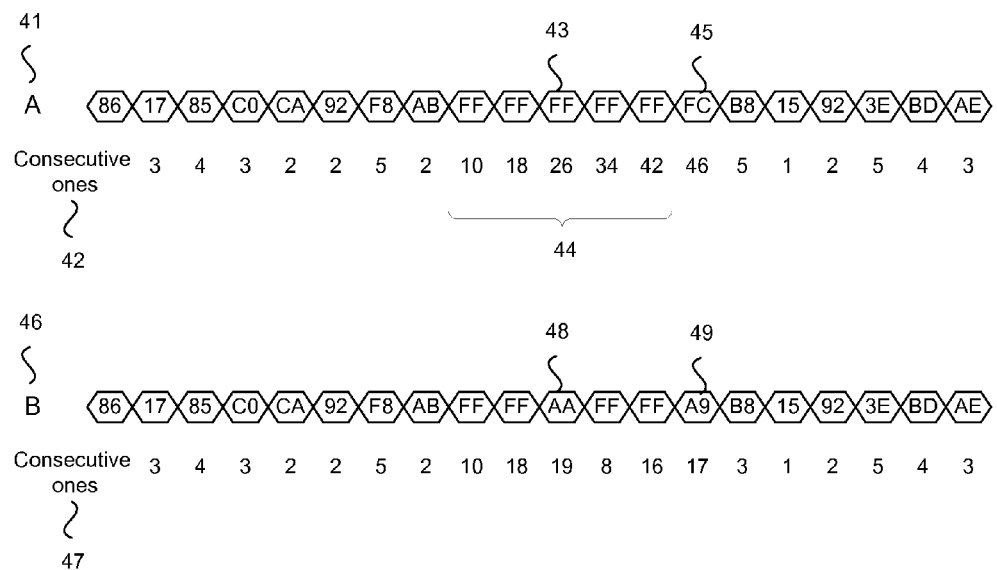
FIG. 4 illustrates a transmission stream before and after inducing CID reduction errors in one embodiment.

In a modification of a regular transmission end system, a CID monitoring module and an error generation module, shown in FIG. 3 in a combined module 33, may be added which functions to avoid consecutive ones or zeroes in the transmission stream above an allowed or threshold level. The CID monitor and error generation module 33 monitors the transmission stream 41 after FEC encoding and scrambling. If the module 33 detects CID above a predetermined threshold, the transmitter generates bit errors which limit the CID. An example byte stream A 41 is shown in FIG. 4. The byte stream 41 is shown with a count 42 of consecutive ones at each stage of the byte stream 41. It will be noted, that the byte stream 41 contains a sequence 44 of five consecutive bytes having a hex value FF (each FF value corresponds to a bit sequence for that byte of eight consecutive ones). In the example of FIG. 4, the CID monitoring module 33 monitors for cases of more than 20 consecutive ones or zeros and errors the odd bits of the last offending byte to meet the criteria of 20 CID maximum. At byte 43 in byte stream 41, the consecutive ones count has reached 26. The CID monitoring module 33 detects this value as being above the allowed threshold and so alters the bit pattern of byte 43 by flipping the odd bits (producing the byte value AA). The output of the CID monitoring and error generation module 33 is shown as the byte stream B 46 with corresponding consecutive ones count 47. Output byte 48 corresponds to input byte 43 and is shown having a hex value AA, corresponding to an alternating pattern of ones and zeros. This induced error resets the consecutive one count so that the number of consecutive ones (or zeros) in this sequence of bytes never exceeds the predetermined threshold of 20. Similarly, byte 45 in the input byte stream 41 may be corrected to byte 49 in the output byte stream 46.

At the receiver end 36 (FIG. 3), the FEC decoder 39 mechanism which corrects errors caused by the transmission medium also corrects the bit errors generated and induced by the transmitter. With RS (255,239), up to 8 bytes per codeword may be corrected. Because the decoder does not know the difference between a line error or CID induced error, the ability for the FEC decoder 39 to correct line errors has been reduced, in this case by the two CID errored bytes. By comparing the bit stream before and after error correction, the receiver reconciles the difference between the true line errors and artificially inserted errors. The receiver will have knowledge of the CID threshold that the transmitter is using to insert errors. One method of reconciling the difference between the line and induced errors is to reproduce the errored signal from the output of the decoder and compare it to the input of the decoder, the difference is the line errors.

Figure 5:
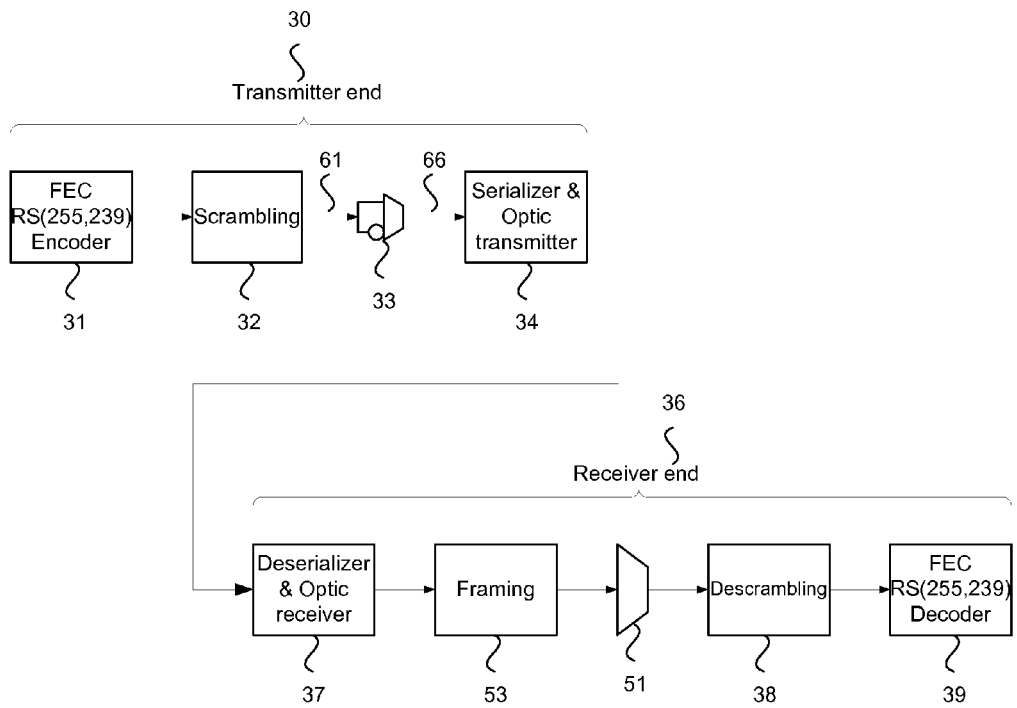
FIG. 5 illustrates transmitter components and receiver components in an alternative embodiment for the process of FIG. 2.
Figure 6:
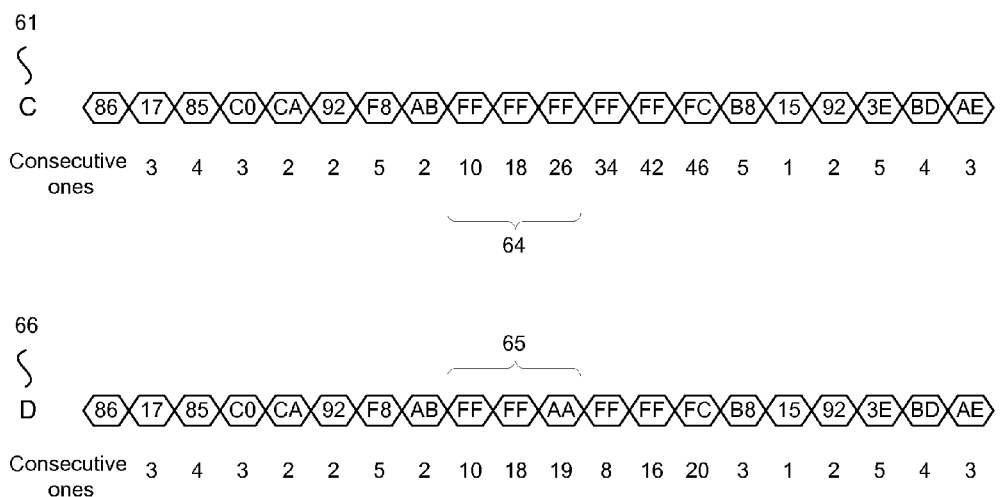
FIG. 6 illustrates a transmission stream before and after inducing CID reduction errors in an alternative embodiment.

In an alternative embodiment illustrated in FIG. 5, the receiver end 36 is configured with a CID error detector and CID error removal module 51 after framing 53 and prior to the descrambler 38. The CID error monitoring and insertion module 33 may be configured to detect certain byte sequences that are known to contain consecutive ones or consecutive zeros greater than a predetermined level. For example, as shown in FIG. 6, the error insertion module 33 of FIG. 5 may be configured to detect a byte sequence 64 of FF, FF, FF in the input byte stream C 61 and replace it with a byte sequence FF, FF, AA 65 in the output byte stream D 66. The CID error detector and error removal module 51 at the receiver end 36 in FIG. 5 may be configured to detect a byte sequence of FF, FF, AA in the received byte stream which represents a known induced error and to replace such a byte sequence with the known original byte sequence of FF, FF, FF bytes, thereby correcting the inserted errors. Since it is possible for the FF, FF, AA sequence to be a non induced error, the FF, FF, FF that the CID error removal creates will be repaired by the FEC decoder, thereby reducing the correction capability for the code word. By comparing the input to the output of the FEC decoder, one skilled in the art can see how to distinguish between errors induced by the CID corrector and true line errors.

A person skilled in the art will readily recognize that other byte sequences may be detected and replaced depending on the allowable number of consecutive ones or zeros. For example, the AA, FF, FF, FC sequence that remains after the previous CID sequence had been replaced and which produces a CID count of 20 may also be modified, for example, if the maximum CID limit were set to some value less than 20. In addition, a person skilled in the art will readily recognize equivalent consecutive zeros examples to the consecutive ones examples described herein.

Figure 7:
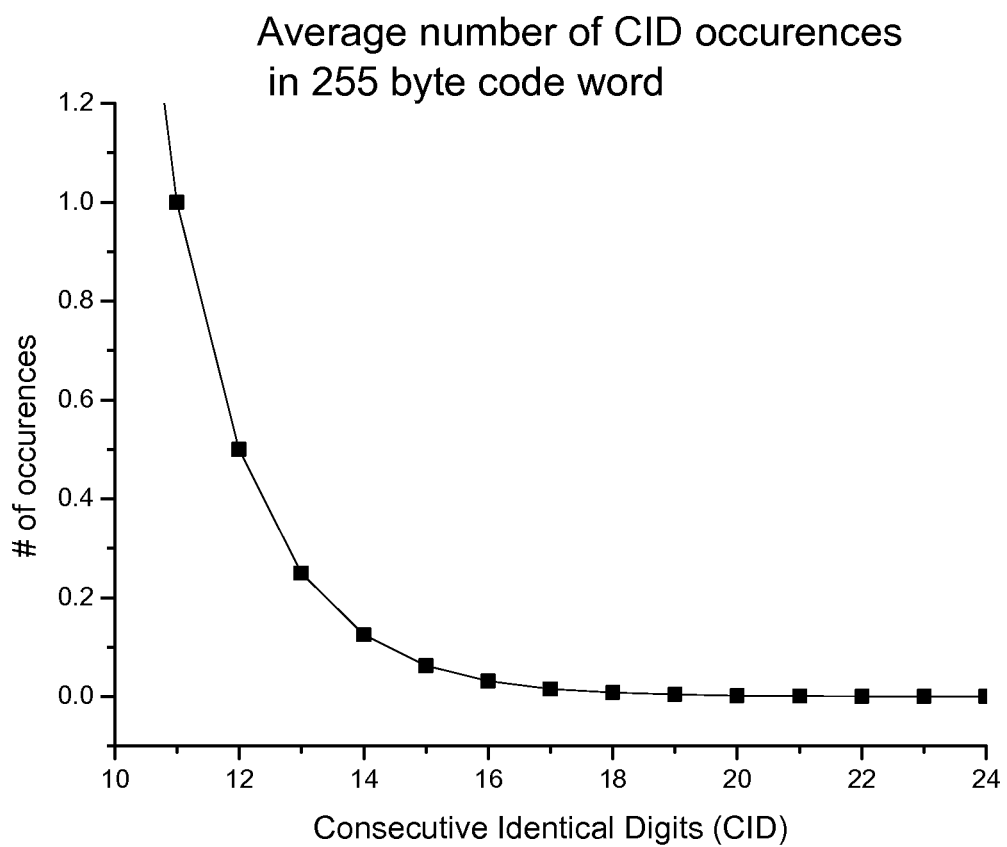
FIG. 7 illustrates the average number of CID occurrences in a 255 byte code word.

The allowable number of consecutive identical digits may be configured according to the requirements of the system and the capabilities of the FEC encoding/decoding. FIG. 7 shows the average number of CID occurrences in a 255 byte code word. In one embodiment the CID allowable number may be less than 50, or may be set at 32 or less. In a refined embodiment, the CID allowable number may be 20, as described above. Preliminary tests by the present inventors have shown that CID requirements of the receiver can be reduced from 72 bits to 16 bits with little degradation of the error correction capability on transmission medium errors. FIG. 7 shows that the occurrence rate of bit patterns requiring induced errors and subsequent correction increases appreciably for CID values less than approximately 14. The greater degree of error correction of the introduced errors at the receiver end occurs at the expense of line error correction. While the numbers provided herein may provide some guidance as to useful CID limits, other limits may be established by a person skilled in the art. In particular, in networks that are not governed by the GPON standards, more appropriate CID limits may be set.

In an example of a non-optical network embodiment, a data transmission network may be based on a disk drive interface, for example that uses 8B10B and FEC on a serial interface. More bandwidth could be obtained on the interface by using scrambling, FEC and applying the principles of CID detection described above. In this example, the number of allowable CIDs may be set at levels dependent on the network which may be vastly different to the numbers specified above in relation to the GPON networks.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient or effective. Also, the information sent between various modules can be sent between the modules via at least one of a data network, the Internet, an Internet Protocol network, a wireless source, and a wired source and via plurality of protocols.

What is claimed is:

1. A method for data transmission comprising:
   analyzing a transmission stream at a transmission end to determine if the transmission stream contains a number of consecutive identical digits exceeding a threshold;
   for a transmission stream that contains a number of consecutive identical digits exceeding the threshold, generating at least one error in the transmission stream that reduces the number of consecutive identical digits below the threshold; and
   transmitting the transmission stream containing the generated at least one error.

2. The method according to claim 1 wherein analyzing the transmission stream comprises counting a number of consecutive identical digits and wherein generating at least one error comprises modifying a bit pattern of a byte of the transmission stream in which the number of consecutive identical digits exceeds the threshold.

3. The method according to claim 1 wherein analyzing the transmission stream comprises detecting a byte pattern having a number of consecutive identical digits that exceeds the threshold and wherein generating the at least one error in the transmission stream comprises substituting the detected byte pattern for an alternative byte pattern.

4. The method according to claim 1 comprising applying a forward error correction encoding scheme to the transmission stream, wherein analyzing the transmission stream is performed after applying the forward error correction encoding scheme.

5. The method according to claim 1 comprising:
   receiving the transmission stream at a receiver; and
   correcting the error in the transmission stream at the receiver.

6. The method according to claim 5 comprising correcting the error in the transmission stream after clock recovery.

7. The method according to claim 5 comprising correcting the error prior to applying a forward error correction decoding scheme to the transmission stream.

8. The method according to claim 5 wherein correcting the error comprises detecting a known error byte pattern in the received transmission stream and substituting the known error byte pattern for a known original byte pattern.

9. The method according to claim 1 wherein the threshold number of consecutive identical digits is 50 or less.

10. The method according to claim 1 wherein the threshold number of consecutive identical digits is 20 or less.

11. The method according to claim 1 wherein the threshold is represented by a consecutive number of byte values.

12. The method according to claim 1 wherein the data transmission is performed from a transmitter of an optical network.

13. A transmitter component of a data transmission network configured to transmit a transmission stream to at least one receiver component of the data transmission network, the transmitter component comprising:
   a consecutive identical digit monitor configured to monitor a transmission stream to determine if the transmission stream contains a number of consecutive identical digits above a threshold;
   an error generator configured to modify a transmission stream having a number of consecutive identical digits above a threshold to reduce the number of consecutive identical digits below the threshold; and
   a transmitter configured to transmit the modified transmission stream to the at least one receiver component.

14. The transmitter component according to claim 13 comprising a forward error correction encoder configured to apply a forward error correction encoding scheme to the transmission stream prior to the transmission stream being passed to the consecutive identical digits monitor.

15. The transmitter component according to claim 13 wherein the consecutive identical digits monitor is configured to count a number of consecutive identical digits in the transmission stream and wherein the error generator is configured to modify a bit pattern of a byte of the transmission stream in which the number of consecutive identical digits exceeds the threshold.

16. The transmitter component according to claim 13 wherein the consecutive identical digits monitor is configured to detect a byte pattern having a number of consecutive identical digits that exceeds the threshold and wherein the error generator is configured to substitute the detected byte pattern for an alternative byte pattern.

17. A receiver component of a data transmission network configured to:
   receive a transmission stream that contains a number of consecutive identical digits exceeding a threshold from a transmission component of the data transmission network; and
   process the received transmission stream to identify at least one induced error in the transmission stream that reduces the number of consecutive identical digits below the threshold.

18. The receiver component according to claim 17 configured to perform clock recovery on the received transmission stream and thereafter process the received transmission stream to correct the induced error.

19. The receiver component according to claim 17 configured to correct the error prior to applying a forward error correction decoding scheme to the received transmission stream.

20. The receive component according to claim 17 configured to correct the induced error during forward error correction decoding of the received transmission stream.

* * * * *